(12) United States Patent
Longmoore

(10) Patent No.: US 7,316,848 B2
(45) Date of Patent: Jan. 8, 2008

(54) HEAT SEALABLE AND PEELABLE FILM

(75) Inventor: Kenneth Longmoore, Newark, DE (US)

(73) Assignee: Applied Extrusion Technologies, Inc. ("AET"), New Castle, DE (US)

( * ) Notice: Subject to any disclaimer, the term of this patent is extended or adjusted under 35 U.S.C. 154(b) by 402 days.

(21) Appl. No.: 11/028,834

(22) Filed: Jan. 4, 2005

(65) Prior Publication Data

US 2006/0147738 A1  Jul. 6, 2006

(51) Int. Cl.
*B32B 27/08* (2006.01)

(52) U.S. Cl. ...................... 428/516; 428/515

(58) Field of Classification Search ............... 428/515, 428/516
See application file for complete search history.

(56) References Cited

U.S. PATENT DOCUMENTS

| | | | |
|---|---|---|---|
| 5,087,667 A | 2/1992 | Hwo | |
| 5,302,442 A | 4/1994 | O'Brien et al. | |
| 5,689,935 A | 11/1997 | Derkach et al. | |
| 5,829,227 A | 11/1998 | Derkach et al. | |
| 5,912,084 A | 6/1999 | Hausmann et al. | |
| 5,997,968 A | 12/1999 | Dries et al. | |
| 6,203,867 B1 | 3/2001 | Derkach et al. | |
| 6,590,034 B2 | 7/2003 | Wanic et al. | |

*Primary Examiner*—D. S Nakarani
(74) *Attorney, Agent, or Firm*—Caesar, Rivise, Bernstein, Cohen & Pokotilow, Ltd.

(57) ABSTRACT

A multilayer, heat-sealable film includes at least a first outer layer and a second, heat-sealable inner layer having a first surface adhered to the outer layer and a second, opposed surface adapted to be heat sealed to and peeled from another surface. The first outer layer comprises a mixture of a polypropylene and a second polymer immiscible in the polypropylene, with the polypropylene constituting over 50% by weight of the mixture. The second layer is free of polybutylene and is formed predominantly of polymers from the group consisting of propylene-ethylene copolymers, ethylene-propylene-butene-1 terpolymers and propylene-butene-1 copolymers, wherein the propylene in the copolymers and terpolymers constitutes over 50%, by weight, of such copolymers and terpolymers. The films have a peel strength of less than 250 g/in. with peel separation taking place at the interface between the second layer and the first outer layer and/or through the first outer layer. The films of this invention are stand-alone films that can be employed by themselves and/or can be laminated to one or more additional outer films to form a composite film structure.

18 Claims, No Drawings

HEAT SEALABLE AND PEELABLE FILM

FIELD OF INVENTION

This invention relates to heat sealable and peelable films, and more specifically to heat sealable and peelable films without reduced seal integrity.

BACKGROUND OF THE INVENTION

The prior art discloses a number of heat sealable plastic films having desired peel characteristics.

U.S. Pat. No. 6,590,034, issued to Wanic et al., discloses heat sealable and peelable films employing a blend of at least two immiscible polymers in the outer seal layer. Thus, the layer that provides the heat seal function is the one that is formed with the immiscible polymers to provide a weakened structure. This can adversely affect seal integrity.

Statutory Invention Registration H1727, to Jones et al., discloses a heat sealable, co-extruded multi-layer packaging film identified as having a peelable, easy-opening feature. In this structure, a first layer is provided with a blend of polypropylene and a primary resin, which can be a low density polyethylene. This first layer, which is described as being easily peelable, is disposed in contact with a second, outer, heat-sealable layer that is required to include polybutylene. As disclosed, the heat-sealant layer separates from the first layer at the interface thereof when a peeling force is applied to the film. The Jones et al. Statutory Invention Record does not disclose the relative amounts of polypropylene and primary resin included in the first layer. Also, the heat-sealing temperature of polybutylene, which is a required component in the heat sealant layer, shifts upward, i.e., increases, over time, thus making polybutylene an undesirable component in heat-sealant layers.

U.S. Pat. No. 5,997,968, issued to Dries et al., discloses a peelable, heat-sealable, multilayered polyolefin film in which two incompatible polyolefins are blended in an outer, peelable surface layer. The multilayer structure disclosed in the '968 patent includes at least three (3) co-extruded polyolefinic layers including a base layer, an intermediate layer and the blended, peelable surface layer, with the intermediate layer being between the base layer and the peelable surface layer. Thus, the peelable surface layer, which includes the blend of incompatible polymers, is the heat-sealable layer of the film and can adversely affect seal integrity.

U.S. Pat. No. 5,087,667, issued to Hwo, discloses a film having a peelable layer comprising a mixture of ethylene polymer, butene polymer and propylene polymer, and this peelable layer bonds to a polypropylene substrate by extrusion lamination without the need for an adhesive. There is no disclosure of blending incompatible polymers in any core layer to enhance, or control peelability.

U.S. Pat. No. 5,302,442, issued to O'Brien et al., discloses a film having an outer heat-seal layer comprising a ternary blend of a random ethylene-propylene copolymer, a butene polymer and a low density polyethylene. Separation of the film is described as taking place at the heat-seal interface between the heat-seal layers. This patent does not disclose a film having an incompatible blend of polymers in a core layer for the purpose of both weakening the core and providing a weakened interface between the core and heat-seal layer to provide controlled peelability at the interface and/or through the core, without adversely affecting seal integrity.

U.S. Pat. No. 5,912,084, issued to Hausmann et al., discloses a packaging seal layer, which is peelable, including a blend of: (a) a non-polar, non-ionomeric thermoplastic, which can be a polypropylene homopolymer, and (b) a polar ethylene copolymer having a carbon monoxide functionality and being present in an amount of 1-90% by weight based upon the weight of the blend. There is no disclosure of providing an incompatible blend in the core layer of a multilayer film for the purpose of providing controlled peelability without adversely affecting seal integrity.

U.S. Pat. Nos. 5,689,935; 5,829,227 and 6,203,867, all issued to Derkach et al., disclose a product package described as having reliable, controlled openability. The disclosed lamination is required to include an internal, three-layer, adhesive component providing internal adhesion between inner and outer film layers. The adhesive component includes outer layers of polyethylene and an inner polypropylene layer, wherein controlled opening is provided at one of the interfaces between the polyethylene layers and the polypropylene layer. The structures disclosed in the Derkach et al. patents are fairly complex, and do not provide controlled peelability at the interface between a heat-sealable outer layer and an adjacent layer to which it has an incompatible bond.

Although a variety of films have been disclosed for providing controlled peelability or openability in packaging constructions, a need is believed to exist for a simple film structure providing a controlled, reduced seal and peal strength but without adversely affecting the seal integrity provided between a heat-seal layer of the film and another surface. It is to such film structures that the present invention relates.

SUMMARY OF THE INVENTION

The above and other objects of this invention are achieved in a multilayer, heat-sealable film that preferably is transparent and includes at least a first outer layer and a second, heat-sealable inner layer having a first surface adhered to said outer layer and a second, opposed surface adapted to be heat sealed to and peeled from another surface, said first outer layer comprising a mixture of polypropylene and a second polymer immiscible in said polypropylene, said polypropylene constituting over 50% by weight of the mixture, said second layer being free of polybutylene and being formed predominantly of polymers from the group consisting of propylene-ethylene copolymers, ethylene-propylene-butene-1 terpolymers and propylene-butene-1 copolymers, wherein the propylene in the copolymers and terpolymers constitutes over 50%, by weight, of such copolymers and terpolymers, said film having a peel strength of less than 250 g/in. with peel separation taking place at the interface between the second layer and said first outer layer and/or through said first outer layer.

In a preferred embodiments of this invention the second polymer that is immiscible in the polypropylene is a low density polyethylene or a medium density polyethylene. However, other polymers that are immiscible in the polypropylene can be utilized, such as linear low density polyethylene (LDPE) and polar modified polyethylene, e.g., ethylene methyl acrylate (EMA) and ethylene acrylic acid (EAA). Other immiscible polymers usable in this invention can be easily determined by people skilled in the art.

In a preferred embodiment of this invention the first outer layer is an internal core layer of a multilayer film including a functional skin layer on the side of the core layer opposed to the side including the second heat-sealable layer. Preferably, in this multilayer structure the functional skin layer and the second heat sealable layer are thinner than said core layer.

In the preferred films of this invention the second heat-sealable layer is formed predominantly of propylene-ethylene copolymers including no more than 10%, by weight, of ethylene therein or terpolymers of propylene-ethylene-butene-1, wherein the polypropylene is the major polymer, by weight, in the terpolymer.

In the preferred structures the second polymer that is immiscible in the polypropylene is present in an amount of approximately 4% to approximately 20%, by weight, based upon the weight of the polymers in the core layer. More preferably the second polymer is present in an amount of from about 4% to 16%, based upon the weight of polymers in the core layer. Even more preferably the second polymer is present in an amount no greater than 12% by weight of the polymers in the core layer.

DETAILED DESCRIPTION OF THE INVENTION

Reference in this application to "polypropylene" unless indicated otherwise, means a crystalline propylene homopolymer or a copolymer of propylene with another α-monoolefin having from 2 to 5 carbon atoms in an amount insufficient to have a significant effect on the crystallinity of the polypropylene. Typically, this is ethylene in an amount of less than 2%, and more preferably less than 1% by weight of the copolymer.

Reference in this application to "α-monoolefin" unless indicated otherwise, means a linear unsaturated hydrocarbon monomer having one carbon-carbon double bond, which double bond is located at the end of the linear chain. The term is intended to include any such monomer having 6 carbon atoms or less, including ethylene and propylene.

The term "self-supporting" in reference to a film or layer means that the film or layer can support itself without the aid of any additional supporting layers to provide the necessary strength and body and it can readily be handled without being adhered to another substrate. Such a film or layer may also be referred to as a "stand-alone" film or layer, as the case may be.

This invention is a heat sealable, multilayer film structure requiring a reduced peel force to separate, or open the film, while maintaining the seal integrity commonly attained by prior art, multilayer heat-sealable film structures that do not have a reduced peel force.

A typical prior art, heat sealable coextruded polyolefin film structure is comprised of a polypropylene core and a polyolefin copolymer or terpolymer sealant layer coextruded on one or both sides thereof. The seal properties of such a structure, such as the seal strength, seal initiation temperature and seal leak rate are primarily dictated by the composition of the polyolefin sealant, the thickness of the sealant layer and to some extent the temperature at which the seal is produced. For a given sealant polymer, a thicker sealant layer generally results in a lower seal initiation temperature, a higher seal strength and generally a lower seal leak rate. In the present invention, the heat seal strength is reduced and controlled relative to prior art films, but without adversely affecting the seal initiation temperature and the seal leak rate.

In accordance with this invention, the heat sealable film is a multilayer structure including at least two layers that are coextruded and preferably biaxially oriented. Specifically, the coextruded film of this invention includes a first outer layer and a second heat-sealable inner layer. The heat-sealable inner layer includes a first surface adhered to the first outer layer and a second, opposed, outer surface adapted to be heat sealed to, and peeled from another surface, such as a different section of the heat-sealable inner layer or another layer of the same or different film.

In the most preferred embodiment of this invention the multilayer film includes an additional functional layer on the side of the first outer layer opposed to the side including the second heat-sealable inner layer. Most preferably this additional functional layer is directly adhered to the first outer layer as part of the coextrusion process in which the multilayer film is formed. However, in accordance with the broadest aspects of this invention, the additional functional layer can be applied either as a coating or as a separate extrudate onto the first outer layer after the coextrudate including the first outer layer and second heat-sealable inner layer has been oriented in the machine direction in a conventional tenter process, but prior to orienting the coextrudate in the cross-machine direction.

As noted above, the inclusion of an additional functional layer in the multilayer film of this invention is optional, and does not constitute a limitation on the broadest aspects of this invention. Moreover, the additional functional layer can be any one of a variety of well known film compositions, and, can actually be a heat-sealable film layer identical to the heat-sealable inner layer employed on the opposed side of the first outer, or core, layer.

The functional layer included on the side of the outer layer opposed to the inner heat-sealable layer, which is an optional layer, can be of a variety of different materials; not constituting a limitation on the broadest aspects of this invention. For example, as stated above, the functional layer can be employed as a heat-sealable skin layer. Such a layer will be of a material of lower softening point than the core so that when heat is applied to affect the seal, the orientation of the core layer will not be disturbed. A commonly used polymer in heat-seal layers is a terpolymer of propylene, ethylene and butene-1. Other polymers that can be employed in a heat-seal layer include propylene-ethylene copolymers, propylene-butene-1 copolymers, or polyvinylidene chloride. These polymers are well-known to people skilled in the art.

Another commonly used functional layer is a slip layer employed to facilitate handling of the film during later converting operations. Such a layer is comprised of a polymer containing a slip agent, such as a high molecular weight fatty acid amide. The additional functional layer may also contain an antiblock additive to facilitate unwinding of the film after it has been wound at the terminus of the film manufacturing process.

Conventional additives, in conventional amounts, can be included in the multilayer films of this invention, provided that no additive should be included that can negatively affect the performance of the layer into which it is incorporated or that can migrate into another layer and negatively affect the performance of that layer in carrying out its intended function. Suitable conventional additives include antioxidants, pigments, orientation stress modifiers, flame retardants, antistatic agents, antifoggants and slip agents.

Film forming and drawing to affect biaxially orientation can be carried out by conventional techniques in accordance with this invention, i.e., the well known tubular (bubble) process or the equally well known tenter process can be employed. When the films are prepared by the bubble process, the draw is affected simultaneously and uniformly in the machine and cross-machine directions to about 3× to 7× and preferably 5× to 7×. Using the tenter process, drawing is carried out sequentially to about 3× to 7× in the machine direction and to about 7× to 11× in the cross direction.

In accordance with a very important aspect of this invention the outer layer, which is adhered to the heat-sealable layer and actually constitutes a core layer in a preferred multilayer heat-sealable film including an additional functional layer on the side of the outer (core) layer opposed to the heat-sealable inner layer, is a mixture or a blend of polypropylene and a second polymer that is immiscible in the polypropylene, with the polypropylene constituting over 50% by weight of the mixture. Due to the immiscibility, two distinct phases are present, each with its own distinct properties, e.g., melting points and re-crystallization temperatures. The incompatibility of the materials in the blend, which results in two distinct phases, creates a weakened layer and also a weakened bond interface to the inner, heat-sealable layer. When the sealed film is peeled to open it, the film will separate through the weakened layer and/or at the weakened bond interface, in a controlled manner; not through the heat-sealable layer. Since the heat-sealable layer is not required to tear upon opening it can be formed of the same desired polymers as in other heat-sealable films; thereby maintaining the desired, or required seal integrity. In other words, in accordance with this invention controlled peelability is achieved without adversely compromising, or affecting the seal integrity.

In the preferred embodiments of this invention, the second immiscible polymer preferably is a low density polyethylene (LDPE) having a density less than 0.92 gr/cc or a medium density polyethylene (MDPE) having a density in the range of about 0.92-0.94 gr/cc. Most preferably the second immiscible polymer is present in a percentage range of from about 4% to about 20%, by weight, based upon the weight of the polymers in the core layer. More preferably, the second polymer is present in the range of about 4% to about 16%, by weight, based upon the weight of the polymers in the core layer. Based upon present testing, it does not appear that including as much as 16% LDPE in the core layer shows substantial improvement over the use of LDPE in the range of 10-12% by weight. However, applicant believes there may be some additional benefits to employing a higher level of an immiscible polymer, such as LDPE. The stated percentages of the second immiscible polymer, while being determined for LDPE, are believed to be applicable to MDPE and possibly to other immiscible polymers that may be usable in this invention.

Although applicant has obtained excellent results by employing both LDPE and MDPE as the second immiscible polymer in the core layer, it should be understood that other immiscible polymers may be employed in the invention, provided that such polymers establish a desired weakened core layer and/or a desired, weakened interface between the core layer and the heat-sealable inner layer, to thereby permit separation of the film through the core layer and/or weakened interface when the heat seal is peeled open.

In accordance with this invention, the heat-sealable inner layer is free of polybutylene and preferably this layer is formed predominantly of polymers from the group consisting of propylene-ethylene copolymers, ethylene-propylene-butene-1 terpolymers and propylene-butene-1 copolymers wherein the propylene in the copolymers and terpolymers constitutes over 50% by weight of such copolymers and terpolymers.

The preferred propylene-ethylene copolymers usable in the heat-sealable layer have an ethylene content of less than 10% by weight of the copolymer and more preferably in the range of 4.5 to 6% by weight. A representative, but non-limiting, propylene-ethylene copolymers usable in the heat-sealable layer is Fina 9470Z sold by AtoFina Chemicals located in Houston Tex. and having an ethylene content of about 5-5.5% by weight.

A preferred ethylene-propylene-butene-1 terpolymer usable in the heat-sealable layer in accordance with this invention includes 2% ethylene, 15% butene-1 and 83% propylene therein. Such a terpolymer is available from Sumitomo Chemical in Tokyo, Japan under the designation or brand name SPX78L1. This terpolymer includes 0.3% Tospearl T-120 in it to aid in providing slip and antiblock properties in the film.

A representative propylene/butene-1 copolymer usable in the heat seal layer includes 15 to 30% by weight butene-1 therein. A preferred propylene/butene-1 copolymer includes 25%, by weight, butene-1 therein and can be obtained from Sumitomo Chemical under the brand designation SP 89.

Heat-seal compositions are well known to those skilled in the art, and, in accordance with this invention, the most preferred heat seal polymers are polyolefins, and most preferably the polyolefin copolymers and terpolymers described above.

It should be understood that the blend, or mixture, of polypropylene and immiscible polymer in the core layer results in a reduction in the heat-seal strength without adversely affecting seal integrity. In fact, as the amount of incompatible polymer in the core layer increases, the heat-sealed strength is reduced. Seal integrity is not adversely affected because the composition of the heat seal layer does not need to be modified in any way in order to establish controlled peelability of the film when the heat seal is peeled open. Peelability takes place through the core layer and/or at the interface of the core layer with the heat-sealable layer and/or possibly at the interface of the core layer with a functional polymer layer, if one is employed in the structure.

For example, in a film employed as a control, the core layer included only polypropylene, without a second immiscible polymer. The seal strength of that film was 398 g/in., thereby providing a very tenacious seal and uncontrolled opening thereof. This same film, with the addition of 8% LDPE to the core layer, provided a reduced seal strength of 212 g/in.

In a stiffer laminated structure without an immiscible polymer in the core layer a peel strength of 697 g/in. was obtained, while adding 8% LDPE to the core layer resulted in a reduced peel strength of 162 g/in.

Applicant has found that by employing as little as 4% LDPE in a polypropylene core layer a reduction in seal strength of about 50% was achieved, as compared to the same film structure, but devoid of any immiscible polymer in the core layer.

It should be noted that the reduction in seal strength, or peel strength, in accordance with this invention is achieved by providing a modified core layer to establish a weakened core layer and/or a weakened interface between the core layer and the heat sealable skin layer (and possibly a weakened interface between the core layer and a second, functional layer if one is employed in the structure). The actual composition of the heat-sealable skin layer remains unaltered, and thereby provides the same desired seal integrity as in prior art structures in which an incompatible or immiscible polymer is not added to the core layer.

A preferred multilayer film of this invention is a three layer structure having a thickness in the range of 0.44 to 2.4 mils and more preferably about 0.75 mils (75 gauge).

The thickness of the heat sealable inner layer preferably is in the range of 0.02 to 0.20 mils and most preferably about 0.04 mils (4 gauge).

The core layer preferably has a thickness in the range of 0.40 to 2.0 mils and more preferably 0.68 mils (68 gauge).

If a second functional layer is included on the side of the outer layer opposed to the side including the heat-sealable layer, that functional layer also is generally very thin, e.g., on the order of 0.02 to 0.20 mils; more preferably about 0.03 mils (3 gauge).

In distinction to prior art heat-sealable films, wherein the lowest acceptable peel strength is about 250 g/in., in accordance with this invention, the peel strengths are required to be less than 250 g/in.; more preferably less than 225 g/in. and even more preferably less than 215 g/in.

The peel strengths of the films of this invention are determined by ASTM F88-00, Volume D 1509.

In accordance with this invention, the seal integrity is substantially the same as in prior art structures in which the peel strength exceeds 250 g/in. Seal integrity is determined by an analysis of the leak rate through the seal. A variety of tests can be employed to determine leak rate. However, in the preferred test either the interior of the sealed package is pressurized or a partial vacuum is created around the sealed package to create a pressure differential across the seal, and the change in the exterior atmosphere is determined.

As noted above, in accordance with a preferred embodiment of this invention, the multilayer film is a three-layer structure having a total thickness of about 75 gauge (0.75 mils), with the inner heat sealable layer being approximately 4 gauge (0.04 mil) and the outer functional layer being approximately 3 gauge (0.03 mil). However, the thicknesses of the various layers can be varied in accordance with the broadest aspects of this invention, depending upon the desired properties, characteristics of the film structure.

A preferred heat-sealable layer is Sumitomo SPX78L1, which is a ethylene-propylene-butene-1 terpolymer including approximately 0.3% Tospearl-T120, an antiblocking agent. Sumitomo SPX78L1 is sold by Sumitomo Chemical. This layer preferably is not oxidatively treated.

The opposed skin layer, which preferably is corona treated to provide a printable surface, is Sonoco TR3120T, which is a ethylene/propylene copolymer containing about 2.5-3.0% ethylene in it. This product is sold by Sonoco, located in Pittsburgh, Pa. This skin layer also facilitates bonding, or laminating, the heat-sealable film to other film structures, as described hereinafter.

Although the films of this invention can be employed as "stand-alone" packaging films in accordance with this invention, such films also can be laminated or bonded to a separate outer film (either monolayer or multilayer structure) having other desired properties or characteristics, e.g., an outer film having a desired oxygen transmission rate and desired water vapor transmission rate, an opaque film, a metallized film, etc. In these latter composite, laminated packaging film constructions the films of this invention constitute the inner, heat-sealable component through which controlled peelability or opening of the composite film structure takes place.

It should be understood that the outer film of the aforementioned composite, laminated packaging film constructions can be any well known single or multilayer film, including clear films, opaque films, metallized films, etc., provided that the outer film can be effectively laminated to the controlled, peelable films of this invention.

In a representative, but non-limiting composite, laminate construction in accordance with this invention, the controlled, peelable inner film is approximately 0.75 mils (75 gauge); the outer film is a 1.20 mil (120 gauge), multilayer, biaxially oriented polypropylene film and the outer and inner films are laminated to each other through a 9# per ream LDPE bonding film layer. The outer film can be any conventional film, such as, but not limited to films sold by Applied Extrusion Technologies, Inc. under the brand designations 120T523-3 and 120AQS. Other films usable in this invention can be easily determined by people skilled in the art, and preferably are transparent films.

While this invention has been described in detail and with reference to specific examples thereof, it will be apparent to those skilled in the art that various changes and modifications can be made therein without departing from the spirit and scope thereof.

What is claimed is:

1. A multilayer, heat-sealable film including at least a first layer and a second heat-sealable layer, said second layer having a first surface adhered to said first layer and a second, opposed surface intended to be heat sealed to another surface, said first layer comprising a mixture of a polypropylene and a second polymer immiscible in said polypropylene, to provide a weakened interface between the first layer and the second heat-sealable layer, said polypropylene constituting over 50% by weight of the mixture, said second layer being free of polybutylene and being formed predominantly of polymers selected from the group consisting of propylene-ethylene copolymers, ethylene-propylene-butene-1 terpolymers and propylene-butene-1 copolymers wherein the propylene in the copolymers and terpolymers constitute over 50%, by weight, of such copolymers and terpolymers, said film with said second opposed surface of said heat-sealable layer heat sealed to said another surface having a peel strength of less than 250 g/in. with peel separation taking place at the interface between the second layer and the first layer and/or through said first layer, said peel strength being less than the peel strength of the second, opposed surface of said heat-sealable layer to said another surface to thereby maintain the seal integrity between said second heat-sealable layer and said another surface.

2. The multilayer, heat-sealable film according to claim 1, wherein said second polymer that is immiscible in said polypropylene is selected from the group consisting of low density polyethylene, linear low density polyethylene, medium density polyethylene and a polar modified polyethylene.

3. The multilayer, heat-sealable film according to claim 1, wherein said second polymer that is immiscible in said polypropylene is a low density polyethylene.

4. The multilayer, heat-sealable film of claim 1, wherein said second polymer that is immiscible in said polypropylene is a medium density polyethylene polymer.

5. The multilayer, heat-sealable film of claim 1, wherein said first layer is an internal core layer, further including a functional skin layer on the side of the core layer remote from the side adhered to the second heat-sealable layer.

6. The multilayer, heat-sealable film of claim 5, wherein said second heat-sealable layer and said functional skin layer are thinner than said core layer.

7. The multilayer, heat-sealable film of claim 1, wherein said second heat-sealable layer is formed predominantly of a propylene-ethylene copolymer including no more than 10%, by weight, of ethylene therein.

8. The multilayer, heat sealable film of claim 1, wherein said second heat-sealable layer is formed predominantly of a propylene-ethylene copolymer including no more than 6%, by weight, of ethylene therein.

9. The multilayer, heat-sealable film of claim 1, wherein said second heat-sealable layer is formed predominantly of the propylene-ethylene-butene-1 terpolymer.

10. The multilayer, heat-sealable film of claim 1, wherein said second polymer that is immiscible in said polypropylene is present in the range of approximately 4% to approximately 20%, by weight, based upon the weight of the polymers in said first layer.

11. The multilayer, heat-sealable film of claim 1, wherein said second polymer that is immiscible in said polypropylene is present in the range of approximately 4% to approximately 16%, by weight, based upon the weight of the polymers in said first layer.

12. The multilayer, heat-sealable film of claim 1, wherein said second polymer that is immiscible in said polypropylene is present in an amount no greater than 12% by weight of the polymers in said first layer.

13. The multilayer, heat-sealable film of claim 1, said film having the peel strength of less than 225 g/in.

14. The multilayer, heat-sealable film of claim 1, said film having the peel strength of less than 215 g/in.

15. The multilayer, heat-sealable film of claim 1, said film being a stand-alone film.

16. The multilayer, heat-sealable film of claim 1, said film being laminated to another plastic film to form a composite packaging film.

17. The composite packaging film of claim 16, said another plastic film being a multilayer, biaxially oriented polyolefin film.

18. The composite packaging film of claim 16, said another plastic film being a multilayer, biaxially oriented metallized film.

* * * * *